United States Patent [19]
Pitt et al.

[11] 3,820,728
[45] June 28, 1974

[54] STATOR WINDING METHOD AND APPARATUS

[75] Inventors: Bruce R. Pitt, Wauwatosa; John W. Wolf, Colgate, both of Wis.

[73] Assignee: The Globe Tool and Engineering Company, Dayton, Ohio

[22] Filed: Apr. 30, 1971

[21] Appl. No.: 139,055

[52] U.S. Cl. .............................. 242/1.1 R, 29/596
[51] Int. Cl. ......................................... H02k 15/085
[58] Field of Search ............ 242/7.03, 1.1 E, 1.1 R; 29/596

[56] References Cited
UNITED STATES PATENTS

| | | | |
|---|---|---|---|
| 2,998,937 | 9/1961 | Potter et al. | 242/1.1 R |
| 3,072,349 | 1/1963 | Busch et al. | 242/1.1 E |
| 3,184,173 | 5/1965 | Walling | 242/1.1 E |
| 3,253,792 | 5/1966 | Brown et al. | 242/1.1 E |
| 3,345,001 | 10/1967 | Straub et al. | 242/1.1 E |
| 3,347,474 | 10/1967 | Frank | 242/1.1 R |
| 3,414,204 | 12/1968 | Friedrich | 242/1.1 R |

*Primary Examiner*—Billy S. Taylor
*Attorney, Agent, or Firm*—Dybvig & Dybvig

[57] ABSTRACT

Some coils wound in a stator core are wound directly into the bottoms of the stator slots. Coils overlapping those wound in the bottoms of the slots are urged radially outwardly toward the bottoms of the slots after the winding thereof.

Wire guide fingers are mounted for radial movement and spring biased to outer positions at which they guide the wires into the bottoms of stator clots. The fingers are driven radially inwardly when coils other than those in the bottoms of the slots are being wound, the drive being disengaged after the winding of each of the last mentioned coils whereupon the fingers are biased back toward their outer positions. If, as common, there are three groups of coils, the first group is wound directly into the bottoms of the slots, the second group is wound with the fingers displaced radially inwardly through a first increment, and, after the winding of each of the coils of the second group, the fingers are biased toward the bottoms of the slots. The fingers are displaced a greater increment radially inwardly when winding coils of the third group.

4 Claims, 5 Drawing Figures

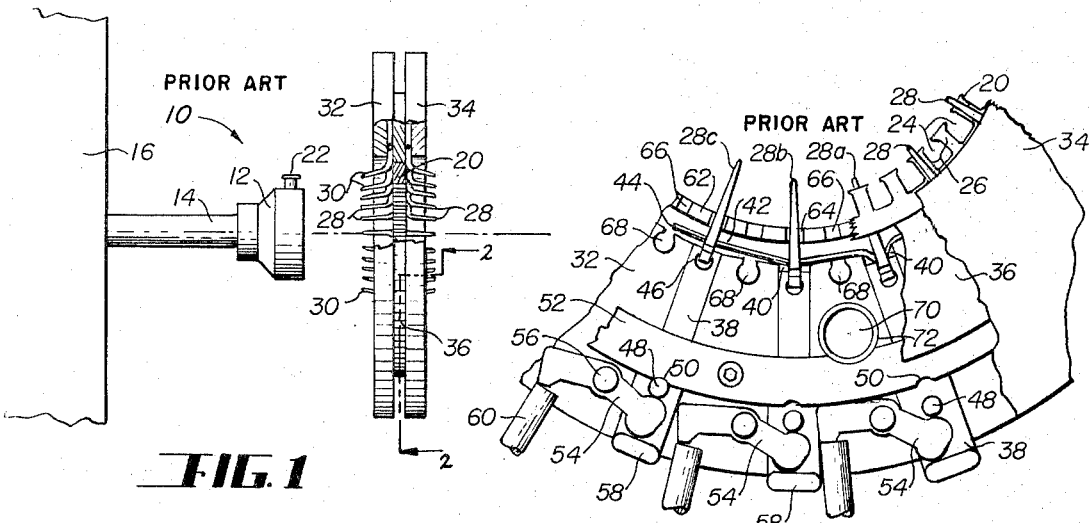
PATENTED JUN 28 1974
3,820,728
FIG.1 PRIOR ART
FIG.2 PRIOR ART
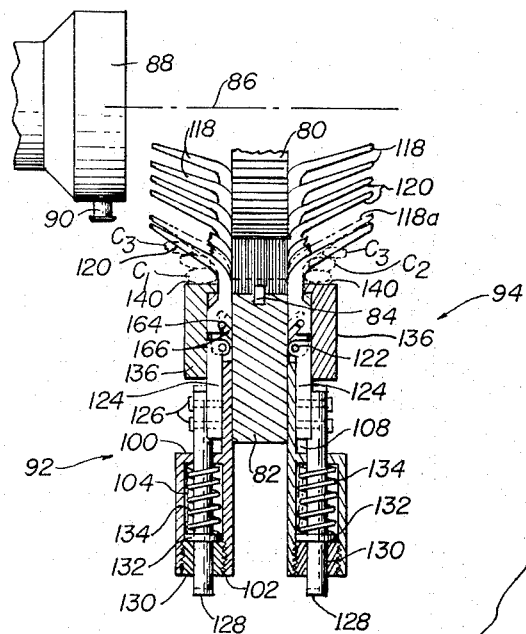
FIG.4
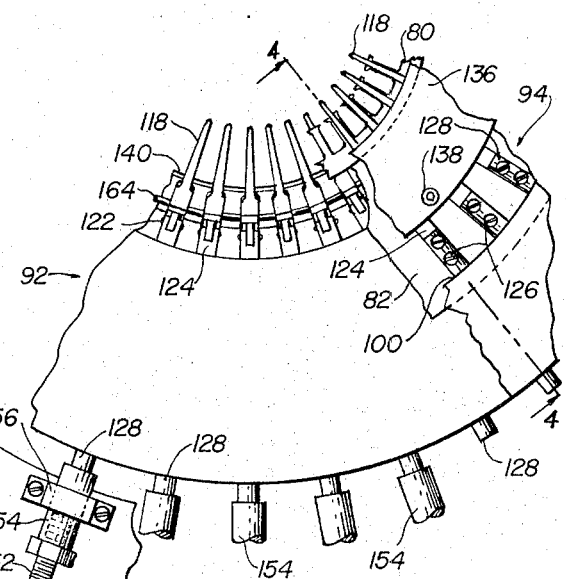
FIG.3
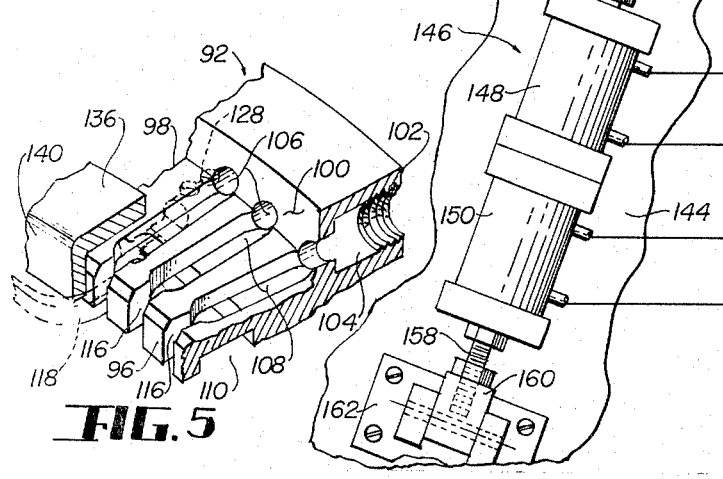
FIG.5
VALVING
MACHINE CONTROLS
INVENTORS
BRUCE R. PITT
JOHN W. WOLF
BY
Dybvig & Dybvig
THEIR ATTORNEYS

STATOR WINDING METHOD AND APPARATUS

BACKGROUND OF THE INVENTION

This invention relates to a stator winding method and apparatus and more particularly to the winding of stators having a plurality of radially extending, inwardly opening coil receiving slots with the use of a plurality of fingers for guiding the wire forming the stator coils into the slots.

Stators have been wound with machines having a reciprocating and oscillating winding head with the wire from the winding head being guided into the stator slots by a plurality of fingers placed adjacent the ends of the stator. The fingers are pivotally connected to tooling rings and, at the end of the winding of all of the stator coils, the rings are moved axially away from the ends of the stator. Due to the pivotal mounting, the fingers pivot and slide out of engagement with the wound coils between the coil end turns and the stator end faces.

Stator winding machines have been built with tooling constructed so that the wire guiding surfaces of the fingers are moved radially inwardly when winding coils which overlap previously wound coils. An example of such a device which may be useful for certain types of stators is shown in U.S. Pat. No. 3,414,204. The closest prior art of which applicants are aware and employing this feature is discussed in relation to FIGS. 1 and 2 below. Such finger movement may be necessary to avoid having the end turns of previously wound coils obstruct the winding of later wound coils.

This invention likewise provides for moving the fingers radially inwardly when winding coils overlapping previously wound coils, and it is an object of this invention to provide improved tooling having radially movable fingers.

In contrast to the known machines, the fingers of this invention are biased to radially outer positions and, at the end of the winding of each of the overlapping coils, the fingers are permitted to return back toward their radially outer positions, thus urging the overlapping coils toward the radially outermost bottoms of the stator slots. It is another object of this invention, therefore, to provide an improved method of stator winding including the urging of a coil radially outwardly toward the bottoms of the stator slots after the coil is wound. The coils wound employing this method are more uniformly tight and compact, resulting in an improved stator, fewer rejects, and a savings in the wire required to wind the stator coils.

Further it is an object of this invention to provide improved, reliable finger tooling including means for mounting the fingers so that the wire guiding surfaces thereof may be located at plural radial distances from the axis of the stator being wound, means for positioning the fingers with their wire guide surfaces at the desired radial spacing from the stator axis, and including means urging the fingers to return from radially inner to radially outer positions after the winding of each coil overlapping an earlier wound coil.

Other objects and advantages will become apparent from the following description and the drawings.

BRIEF DESCRIPTION OF THE DRAWING

FIG. 1 is a diagrammatic representation of a prior art stator winding machine provided with finger tooling.

FIG. 2 is a cross sectional view of a portion of the tooling of FIG. 1 and showing the manner in which the fingers thereof may be moved to various locations at different radial spacings from the stator axis.

FIG. 3 is a side elevational view of a portion of the tooling in accordance with this invention. Parts shown in FIG. 3 have been broken away whereupon parts associated with confronting tooling rings, a stator core and a stator support are all illustrated.

FIG. 4 is a cross sectional view of the structure shown in FIG. 3 taken along line 4—4 thereof and, in addition, shows a winding head and further shows, in phantom lines, displaced positions of a pair of fingers and the end turns of three overlapping would coils.

FIG. 5 is a perspective view of a portion of a tooling ring forming part of the tooling of FIGS. 3 and 4, a finger guide which is connected to the tooling ring, and, in phantom, a portion of a finger and drive linkage therefor.

DESCRIPTION OF THE PREFERRED EMBODIMENT

In FIG. 1 a portion of a stator winding machine generally designated 10, of the type to which this invention is applied, is shown to include a winding head 12 mounted upon a ram or the like device 14 which extends into a housing 16 for a reciprocating and oscillating drive mechanism. As well known to those versed in the art, the winding head 12 is reciprocated by the drive mechanism along the stator axis 18 through and beyond both ends of a stator core, such as that designated 20, to be wound. At each end of its reciprocating stroke, the winding head 12 is oscillated, the oscillations being through equal angles but in opposite directions, whereby wire (not shown) fed from a suitable wire supply (not shown) and projecting from a winding head needle 22 is wound into a coil received in coil receiving slots designated 24 (FIG. 2) located between radially extending stator teeth 26. In actual practice there may be more than one winding head needle 22 whereupon wire is drawn from more than one wire supply so that plural coils are wound into the stator slots during each complete reciprocating and oscillating cycle of the winding head 12.

After a first coil or set of coils is wound, the stator core is indexed relative to the winding head 12 to position other pairs of slots in alignment with the needle or needles 22 for the winding of a second coil or set of coils. The winding progresses until the desired number of coils have been wound. The wire from the last wound coil or coils is then cut whereupon the wound stator is removed from the winding area. Mechanisms for supporting the stator with its axis 18 in alignment with the winding head 12, mechanisms for causing the repeated relative indexing of the stator with respect to the winding head 12, and mechanisms for cutting the wire at the end of the winding of one stator and holding the wire until commencement of the winding of the next stator are all well known and, hence, not described or illustrated herein. Similarly, drive mechanisms for reciprocating and oscillating the winding head 12 are common and therefore not disclosed.

Because of the limited space in the slots of a stator of the type having a relatively large number of slots, it is not feasible to design winding heads capable of winding overlapping coils into the stator slots without the assistance of some form of wire guide. The wire guiding means shown in FIG. 1 consists of plural wire guide fingers 28 pivotally supported adjacent the ends of the stator 20. The wire guide fingers 28 are positioned in a circular array and aligned with selected ones of the stator teeth 26. The fingers 28 have radially outer, axially extending wire guide surfaces 30 which slope radially inwardly from the ends thereof adjacent the stator end faces. Accordingly, as the winding head 12 is reciprocated and oscillated to wind a coil, the wire emerging from the needle 22 is guided by the needle 22 onto the wire guide surfaces 30 of pairs of aligned fingers 28 and, as the winding head 12 continues its movement, the wire is cammed up the wire guide surfaces 30 into the radially outermost bottoms of a pair of stator slots 24. After all the coils are wound in the stator and, fingers 28 are moved axially away from the stator and, due to their pivotal mounting, the portions of the fingers over which the coils are wound slip or cam away from engagement with the wound stator between the coil end turns and the stator core. This type of so-called "finger tooling" is well known.

The tooling shown in FIG. 2 was designed for use in winding a basically common type of stator having three groups of coils. Each coil of the first group has its sides located in the bottoms, i.e., radially outermost, portions of pairs of stator slots. Each coil of the second group has one side located adjacent the bottom of one slot and its other side spaced remote from the bottom of its slot because of the overlapping of its end turns with a coil of the first group. Each coil of the third group overlaps one coil of the first group and one coil of the second group and, hence, both its sides are spaced from the bottoms of the slots. The tooling of FIG. 2 is unusual because the fingers 28 are designed to occupy a first, radially outermost position in which they guide the wires into the bottoms of the slots when the coils of the first group are wound. Such a finger would be located as shown at 28a in FIG. 2. The finger 28 used to guide the wire forming coils of the second group are displaced toward the stator axis and occupy the position generally indicated by the finger 28b in FIG. 2. The coils of the third group are wound with the associated fingers displaced even closer to the stator axis as illustrated by the position of finger 28c in FIG. 2.

The prior mechanism for locating the fingers 28 at three different radial positions illustrated in FIGS 1 and 2 includes substantially identically constructed tooling rings 32 and 34 and a cradle or the like support device 36 supporting the stator core 20 between the tooling rings 32 and 34. Since the two tooling rings are of substantially identical construction, only the parts of the tooling ring 32 are illustrated or described in detail herein.

With reference to FIG. 2, the fingers 28 are pivotally mounted to the inner ends of drive links 38 slidable in radially extending grooves 40 formed in the face of the tooling ring 32 confronting the stator core. There are as many drive links 38 and grooves 40 receiving them as there are fingers 28. A large O-ring 42, which is located in an annular groove 44 in the tooling ring 32, is lodged in tapered slots 46 in each of the fingers 28. The O-ring 42 prevents the fingers 28 from pivoting uncontrollably to undesired positions when the tooling ring 32 is moved away from the stator core 20. Also, the O-ring 42 biases the fingers 28 radially inwardly. The radially innermost position of the drive links 38 and, accordingly, the fingers 28 is determined by engagement of the stop pins 48 affixed to the drive links 38 in notches 50 in a stop ring 52 connected to the tooling ring 32. Each drive link 38 is individually moved radially outwardly by means of a positioning lever 54 associated therewith mounted by a pivot pin 56 to the tooling ring 32. One end of each positioning lever 54 engages a flange 58 on the outer end of each drive link 38. The other end of the positioning lever 54 is engageable by a drive rod 60 which may be driven by a fluid operated cylinder or the like to overcome the bias of the O-ring 42 and move the drive links 38 and, accordingly, the fingers 28, incrementally to positions spaced radially further from the axis of the stator 20.

It will be noted that a flange 62 is formed at the inner margin of the tooling ring 32, which flange has plural radially extending slots 64 in which the fingers 28 are nestled. The flange 62 also has plural radial slots 66 aligned with slots 68 in the body of the tooling ring 32 to which additional, but radially fixed fingers (not shown) may be pivotally mounted. Such fingers would not be used in the winding of coils but may be used to control the position of cross-over wires between coils. Also it will be noted that the tooling ring 32 is bored at 70 and that the bore is lined by a bearing sleeve 72. There may be several such bores and bearing sleeves for the purpose of receiving support rods or the like by which the tooling rings are mounted relative to the stator.

Although the device shown in FIG. 2 represents an advance over tooling in which the fingers cannot be moved radially inwardly, it has certain drawbacks. It has been found that the slots of stators wound in this type of tooling may be so completely filled with coils that it is difficult to insert insulating wedges in the open ends of the stator slots. The circumferential span of the positioning levers 54 restricts the number of fingers 28 which can be mounted for radial movement. Hence, there are only half as many fingers 28 on each side of the stator core 20 as there are stator teeth 26. Accordingly, the shape and position of the coils to be wound may not be adequately controlled. These drawbacks are overcome by this invention which will now be described in connection with FIGS. 3, 4 and 5.

Referring first to FIG. 4, a portion of a stator core 80, which may be identical to the stator core 20, is shown mounted by a cradle or support member 82 to which it may be removably affixed as by a key 84. Here it may be noted that a variety of methods may be used for supporting the stator core, it only being important for purposes of this invention that the stator core be mounted in fixed relation to the tooling during the winding cycle are removable from the tooling by relative axial movement between the stator 80 and the tooling rings which are described below. Since suitable stator supporting methods are known and in use, they are not described in detail herein. The stator core 80 is supported with its axis 86 aligned with the axis of reciprocation and oscillation of a winding head 88 having a wire guide nozzle or needle 90.

The two tooling rings are designated 92 and 94 and, since both tooling rings 92 and 94 are of substantially identical construction, the parts thereof described below are identified by the same reference characters and the description is with primary reference to ring 92.

With reference to FIGS. 4 and 5, the tooling ring 92 is shown to comprise an annular plate having a central bore permitting the winding head 88 to pass therethrough and defined by an inner margin 96. The outer face of the tooling ring 92, that is the face opposite the face confronting the stator 80 and its support 82, is counterbored to form a reduced thickness portion 98 terminating in an annular shoulder 100 concentric with the inner margin 96 and the outer margin, designated 102, of the ring 92. A plurality of circumferentially spaced radially extending threaded bores 104 are formed in the outer margin 102, the bores 104 having reduced diameter portions 106 opening to the shoulder 100. The outer face of the reduced thickness portion 98 has a plurality of radially extending grooves 108 aligned with the reduced diameter bore portions 106. The inner face of the ring 92, that is the face confronting and abutting the stator core 80 and its support 82, is planar but for an annular groove 110 concentric with and adjacent the inner margin 96. Radial slots 116 opening both to the annular groove 110 and the radial grooves 108 are cut in the inner margin 96.

With reference also to FIG. 3, the grooves 108 and 110 and the slots 116 are adapted to receive a plurality of radially extending and circumferentially spaced wire guide fingers 118 which are aligned with the stator teeth and which function in the same manner as the previously described wire guide fingers 28. That is, they have axially extending, wire guiding outer surface portions 120 adapted to guide wires into the stator slots to form coils during the reciprocating and oscillating movements of the winding head 88. Each finger 118 has a tongue portion pivotally connected by a pivot pin 122 to the bifurcated inner end of a drive link 124 slidable along a linear path in one of the grooves 108. Affixed to the outer end of each drive link 124 as by bolts 126 is a drive plunger 128 which projects centrally through the bores 104 and extends radially outwardly beyond the outer margin 102 of the tooling ring 92. An apertured cap 130 is threaded into the outer end of each bore 104, the cap 130 being bored to slidably receive the plunger 128. Each plunger 128 has integral therewith or affixed thereto a peripheral disc-shaped stop member or flange 132 located within the bore 104. Trapped between the flange 132 and the innermost end face of each bore 104 is a coil spring 134 which biases the associated plunger 128 radially outwardly. Since each plunger 128 is directly connected to a drive link 124 and pivotally connected to a finger 118, these parts are also biased radially outwardly by the spring 134.

In addition to the parts as thus far described, the positions of the wire guide fingers 118 are controlled by annular finger retaining plates 136 having L-shaped cross sections, there being one retaining plate 136 affixed as by bolts 138 (FIG. 3) to the reduced thickness portions 98 of each of the tooling rings. During the winding cycle, the confronting faces of the retaining plates 136 cooperate with the adjacent surfaces of the stator core 80 and its support 82 to prevent pivotal movements of the fingers 118 about their pivot pins 122. The radially innermost end surfaces 140 of the retaining plates 136 are concentric with the inner and outer margins of the tooling ring 92. As will become more apparent, the surfaces 140 act as forms for the outer diameters of the coils to be wound.

It is believed apparent that the springs 135 bias the fingers 118 to radially outer positions which may be adjusted by threading the caps 130 further into or out of the bores 104. Associated with the tooling as thus far described and mounted on any suitable fixed portion of the machine, such as that designated 144 in FIG. 3, are a plurality of drive members generally designated 146 for engaging selected ones of the plungers 128 at each indexed position of the stator 80 and tooling rings 92 and 94. Only one of the drive members 146 is illustrated, it being understood that the rest of the drive members 146 could be identical. The illustrated drive member 146 includes two linear motors in the form of double acting air cylinders 148 and 150 mounted back to back. The piston rod 152 of the cylinder 148 is threaded to a drive rod 154 guided for radial movement in alignment with a preselected plunger 128 as by an apertured block 156. The piston rod 158 of the cylinder 150 is threaded to a mounting block 160 which for ease of assembly may be pivotally mounted to a yoke-like support 162 affixed to the machine member 144.

When both piston rods 152 and 158 are retracted, the drive rod 154 is preferably spaced by a small distance from the end of the plunger 128 aligned therewith. Suitable machine controls and valving mechanisms illustrated schematically in FIG. 3, which may be entirely conventional and, hence, are not illustrated in detail herein, are adapted selectively to extend either the piston rod 152 or 158 or both of them simultaneously. The drive rod 154 can be driven through a first distance radially toward the axis of the stator 80 by energization of a selected one of the cylinders 148 and 150, thereby moving the plunger 128, the drive link 124 and the finger 118 aligned therewith radially inwardly by a first increment. By energizing both cylinders 148 and 150, the drive member 154 and the parts aligned therewith would be driven through a second, larger increment radially toward the stator axis. As will be understood by those familiar with the art, suitable stops in the form of shims or the like are built into the cylinders 148 and 150 to accurately control the increments of movement of the member 154 and, accordingly, the plunger 128 engaged thereby. Upon de-energization of the cylinders 148 and 150, the drive rod 154 is returned to a location out of driving engagement with the aligned plunger 128.

The operation of the tooling illustrated in FIGS. 3, 4 and 5 is as follows. During the winding of coils which are to have both sides located in the radially outermost bottoms of the stator slots, the fingers 118 are positioned as shown in full lines in FIG. 4, biased to their radially outermost positions by the springs 134. As the winding head 88 is reciprocated and oscillated, the wire emerging from the needle 90 slides up along selected wire guide surfaces 120 to form a coil such as that indicated by phantom lines $C_1$ in FIG. 4. It will be noted that the first wire turns guided up the surfaces 120 will ultimately come to rest against the innermost end surfaces 140 of the retaining plates 136. Hence, the location of the end sufaces 140 determines the outer diameters of the coils $C_1$. In some applications, the provision of the surfaces 140 to form the outer diameters of the coils is important because the common practice of forming the coil ends after the winding operation is rendered unnecessary.

When winding a coil such as that designated $C_2$, which partially overlaps the coil $C_1$, the stator core 80 and the tooling rings 92 and 94 are first indexed relative to the winding head 88 and the drive means 146. Each finger 118 to be spanned by coil $C_2$ is then moved radially inwardly by the first increment described above resulting from energization of one of its associated cylinders 148 or 150. When, for example, winding a coil spanning three stator teeth, all six fingers 118 aligned with the three teeth would be moved inwardly. (Here it may be noted that at least a pair of the fingers 118 spanned by coil $C_1$ will also be spanned by coil $C_2$.) The energized cylinders remain energized during the winding of the coil $C_2$. Immediately after coil $C_2$ is wound, the energized cylinders are de-energized and, because they are double acting, the drive members 154 are retracted away from driving engagement with their associated plungers 128 and the bias of the associated springs 134 against the plungers 128 causes them, along with their associated fingers 118, to be retracted. Accordingly, the coil $C_2$ is drawn as deeply as possible into or toward the bottoms of the stator slots. The same procedure is followed in winding the coil $C_3$. Coil $C_3$ overlaps both the coils $C_1$ and $C_2$ and each finger 118 spanned by coil $C_3$ is moved still further radially inwardly by simultaneous energization of both the cylinders 148 and 150 associated therewith. The resulting radially innermost extension of two of the fingers 118 is illustrated by phantom lines 118a in FIG. 4. At the end of the winding of the coil $C_3$ all of the fingers spanned by the coil are biased back toward the bottoms of the slots upon de-energization of the associated cylinder 148 and 150.

Among the advantages of the type of tooling described herein is that there is sufficient flexibility that it may be used for various types of winds. Since each of the fingers 118 is separately driven radially inwardly and separately biased outwardly, the tooling can be used for simultaneously winding coils at different radial spacings from the stator axis. Thus, the winding head 88 may have three needles 90 and three coils would be wound simultaneously. The first three coils would be wound in the bottoms of the slots during which time none of the plungers 128 would be drivingly engaged by the drive rods 154. After the winding of the first set of three coils, the stator core and the tooling rings are indexed relative to the winding head and the drive means 146 in preparation for the winding of a second set of coils. The fingers 118 to be spanned by a coil or coils of the second set overlapping coils of the first set are moved radially inwardly through the first increment by energizing one of the cylinders 148 and 150 associated therewith. The remaining fingers spanned by a coil or coils of the second set are not moved but remain at their radially outer positions. At the end of the winding of the second set of coils, the overlapping coils are moved toward the bottoms of the stator slots in the manner described above. During the winding of subsequent sets of coils, selected ones of the fingers may remain stationary, may be moved inwardly by the first increment or by the second increment depending upon the angle of index and the nature of the winding pattern for the stator.

The number of drive members 146 required will depend upon the number of simultaneously wound coils and the number of stator teeth spanned by each coil. For example, if three coils are to be wound simultaneously and each coil spans three stator teeth, there will be nine drive members 146 for each tooling ring, or a total of eighteen drive members 146. The drive members 146 would be energized in groups of six to simultaneously move, as required, three pairs of axially aligned fingers 118. Conventional valving for the air cylinders 148 and 150 and machine control or sequencing circuits are readily adaptable to provide the proper sequence of operation of the air cylinders 148 and 150 and the relative indexing of the stator core and tooling to the winding head.

At the end of the winding of a stator, the tooling rings 92 and 94 are moved axially away relative to the stator 80. As in the case of prior machines, the fingers 118 are free to pivot about the axis of the pins 122 and thus slide out of engagement with the stator between the coil end turns and the stator end faces. The fingers 118, after being disengaged from the wound stator are returned approximately to the positions thereof shown in FIG. 4 by circular elastomeric members or O-rings 164 (FIGS. 3 and 4) located in tapered slots 166 therein so that they will not act as obstructions to the mounting of an unwound stator core onto the support 82 and engagement of the tooling rings 92 and 94 therewith in preparation for the next winding cycle. It may be observed that the O-rings 164 will tend to bias the fingers 118 radially inwardly. However, the springs 134 are quite strong and fully overcome or resist this bias.

Although the presently preferred embodiment of this invention has been described, it will be understood that within the purview of this invention various changes may be made within the scope of the appended claims.

Having thus described our invention, we claim:

1. In a stator winding machine of the type having a plurality of wire guiding fingers for guiding wire into stator slots receiving coils wound by a reciprocating and oscillating winding head, the improvement comprising means mounting each of said fingers for radial movement with respect to the axis of a stator being wound, bias means biasing each of said fingers toward a radially outermost position, drive means operatively engageable with each of said fingers for moving said fingers radially inwardly, means controlling said drive means for moving said fingers radially inwardly in two increments, the second increment being greater than the first increment, and disengaging said drive means from driving relation with said fingers to permit said fingers to return toward said radially outermost positions at the end of each of said incremental movements.

2. Tooling for a stator winding machine of the type having a plurality of wire guiding fingers for guiding wire into stator slots receiving coils wound by a reciprocating and oscillating winding head, said tooling including an annular member bored to permit movement of said winding head therethrough and having surfaces adapted to abut a stator to be wound, a finger movable along the radius of said member, a plunger received within a radially extending bore in said member, means connecting said plunger to said finger, said plunger havng a portion projecting radially outwardly of said bore, a stop member fixed in relation to said plunger located within said bore, a spring within said bore biasing said stop member and accordingly said plunger outwardly, drive means engageable with the outwardly extending portion of said plunger, said drive means comprising a pair of separately energizable fluid operated linear motors arranged end to end, and means controlling said drive means to energize one of said motors to move said plunger and accordingly said finger radially inwardly through a predetermined distance in advance of the winding of a given coil, to energize both the said motors simultaneously to move said finger radially inwardly through a predetermined larger distance in advance of the winding of another coil, and to disengage said drive means from said plunger at the end of the winding of each coil whereupon said finger is moved radially outwardly by said spring.

3. In a stator winding machine of the type having a pair of tooling rings and plural wire guide fingers pivotally mounted on said tooling rings, the tooling rings being movable toward and away from a stator core and, when moved away, permitting said fingers to pivot so as to move out of engagement with coils wound thereover and of the type having a reciprocating and oscillating winding head for winding coils of wire around said fingers and in slots of said stator, the improvement comprising means on said tooling rings for holding said fingers engaged with the stator core during the winding of coils and cooperating with the stator core to prevent pivotal movement of said fingers throughout the winding of coils, means mounting each of said fingers for radial movement with respect to the axis of the stator, bias means biasing each of said fingers toward a radially outermost position, drive means operatively engageable with each of said fingers for moving said fingers radially inwardly, whereby said fingers may be moved radially inwardly and outwardly without undergoing pivotal movement, and means controlling said drive means for disengaging said drive means from driving relation with said fingers to permit said fingers to be moved by said bias means toward said radially outermost positions at the end of the winding of each coil thereover.

4. The improvement of claim 3 wherein said means controlling said drive means moves said fingers radially inwardly in two increments, the second increment being greater than the first increment, and said controlling means disengaging said drive means for driving relation with said fingers at the end of each incremental movement.

* * * * *

UNITED STATES PATENT OFFICE
CERTIFICATE OF CORRECTION

Patent No. 3,820,728                Dated June 28, 1974

Inventor(s) Bruce R. Pitt and John W. Wolf

It is certified that error appears in the above-identified patent and that said Letters Patent are hereby corrected as shown below:

Abstract line 8, change "clots" to ---slots---.
Col. 4, line 51, change "are" to ---and---.
Col. 5, line 63, change "springs 135" to ---springs 134---.
Col. 10, line 17, change "for" to ---from---.

Signed and sealed this 29th day of October 1974.

(SEAL)
Attest:

McCOY M. GIBSON JR.              C. MARSHALL DANN
Attesting Officer               Commissioner of Patents